Dec. 28, 1937.   J. W. ASPENLEITER   2,103,421
OPHTHALMIC MOUNTING
Filed March 27, 1936
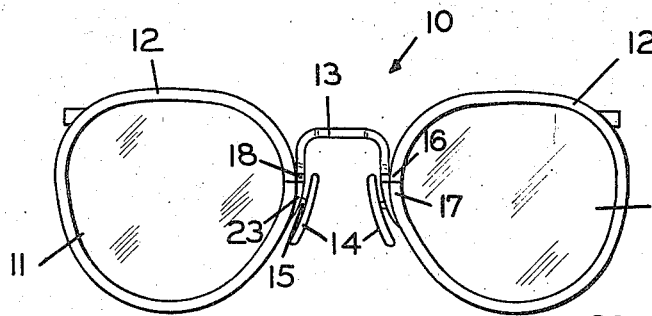
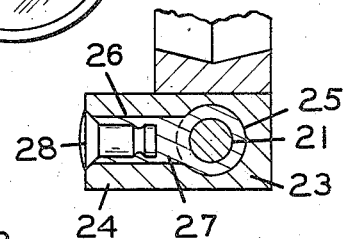
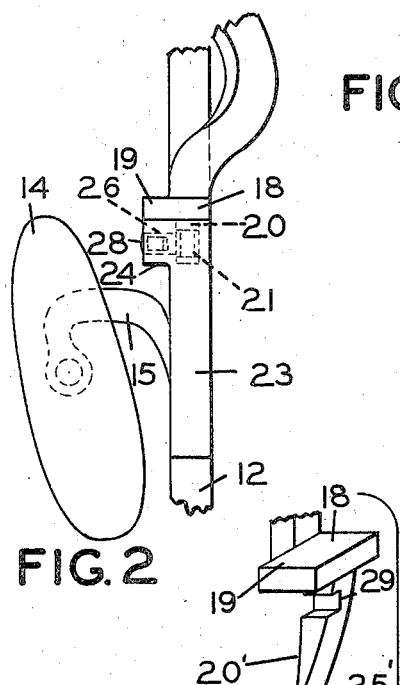
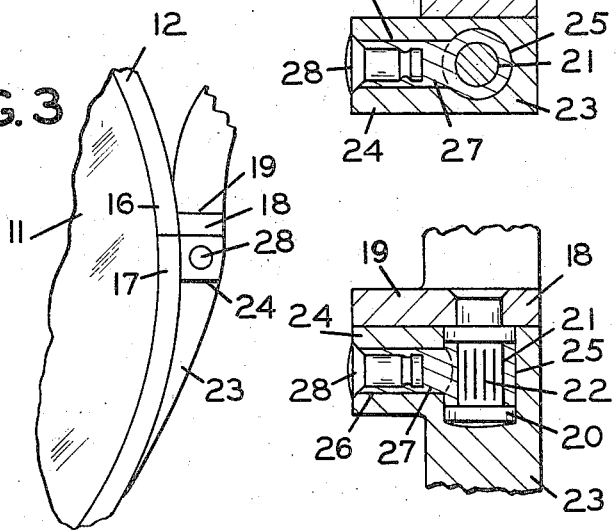
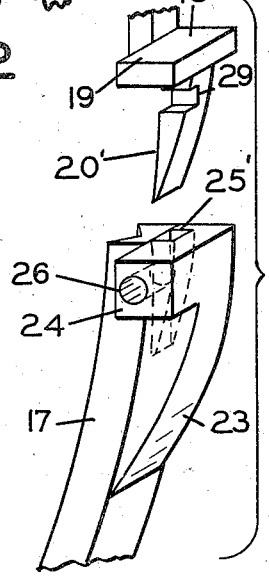
JOSEPH W. ASPENLEITER
INVENTOR
BY
ATTORNEYS Patented Dec. 28, 1937

2,103,421

UNITED STATES PATENT OFFICE 2,103,421

OPHTHALMIC MOUNTING

Joseph W. Aspenleiter, Rochester, N. Y., assignor to Bausch & Lomb Optical Company, Rochester, N. Y., a corporation of New York Application March 27, 1936, Serial No. 71,198

2 Claims. (Cl. 88—47)

The present invention relates to ophthalmic mountings and more particularly to devices for positioning and securing together parts of ophthalmic mountings which are in contact with each other such as the lugs on the ends of a split lens rim, for example.

One of the objects of the present invention is to provide an improved means for positioning and securing together parts of an ophthalmic mounting. Another object is to provide means whereby the ends of a split lens rim may be held together in a simple yet efficient manner. A further object is to provide means whereby the ends of a split lens rim may be accurately positioned and rigidly secured together without the use of screws. These and other objects and advantages reside in certain novel features of construction, arrangement and combination of parts as will hereinafter be more fully set forth and pointed out in the appended claims.

Referring to the drawing:

Fig. 1 is a front view of a pair of spectacles embodying this invention.

Fig. 2 is an enlarged fragmentary side elevation of the split lens rim connection.

Fig. 3 is an enlarged fragmentary rear view thereof.

Fig. 4 is a horizontal section thereof.

Fig. 5 is a vertical section thereof.

Fig. 6 is an exploded view of a modified form of split lens rim connection.

A preferred embodiment of this invention is illustrated in the drawing wherein 10 indicates generally a pair of spectacles having lenses 11 mounted in rims 12 connected by a bridge 13. A pair of nose pads 14 are secured to the rims 12 by arms 15.

Each rim 12 is split to provide adjacent ends 16 and 17. Secured to the upper rim 16 as by hard soldering or the like, is a lug 18 having a flat rearwardly extending portion 19. A projection 20, secured to the lug 18 extends downwardly therefrom, and is provided with a narrow neck portion 21 which may be scored or roughened as at 22.

A lug 23 is secured to the lower rim 17 as by hard soldering or the like and is provided with a rearwardly extending portion 24. A recess 25 is formed in the lug 23 for snugly receiving the projection 20 and an aperture 26 extends through the rearwardly extending portion 24 and opens into the recess 25.

In assembling the mounting according to this invention, the projection 20 is inserted in the recess 25 and the two lugs 18 and 23 held together with pliers or the like which can engage the rearwardly extending portions 19 and 24. A fusible retaining element 27 is then introduced through the aperture 26 and heated until it flows and completely fills the recess 25. The aperture 26 is then closed by a headed finishing plug 28 which is inserted while the fusible material 27 is still soft.

The retaining element 27 is made of a fusible material which has a relatively low melting point so that it may be softened or melted by application of heat which will not, however, be sufficient to damage the lens or the mounting. Such material may be either a non-metallic plastic substance or a metallic alloy of low melting point.

In the modification shown in Fig. 6, the projection 20' is tapered and the recess 25' is given a corresponding taper to receive the projection. On the side adjacent the aperture 26, the projection 20' has a notch 29 and the fusible element 27 fills the aperture 26 and notch 29 thus preventing removal of the projection 20' from the recess 25'.

From the foregoing it will be apparent that I am able to attain the objects of my invention and provide an ophthalmic mounting of the split lens rim type having an improved means for positioning and securing together the adjacent ends of the rim. Various modifications can, of course, be made without departing from the spirit of my invention or the scope of the appended claims.

I claim:

1. An ophthalmic mounting comprising a split lens rim having adjacent ends, a lug carried by each end, cooperating positioning members on said lugs, anchoring means in said members, said members being located so that the anchoring means are in communication, and an integral mass of fusible material molded to and connecting the anchoring means whereby the lugs will be held together.

2. An ophthalmic mounting comprising a split lens rim having adjacent ends, a lug secured to each end, a projection having a reduced neck portion secured to one lug, a recess in the other lug for snugly receiving said projection, an aperture in said other lug opening into said recess adjacent the reduced neck portion of said projection, and an integral mass of fusible material substantially filling said recess, said aperture and the neck portion of said projection.

JOSEPH W. ASPENLEITER.